G. W. HELT.
Stovepipe Thimble.
No. 89,660.
Patented May 4, 1869.
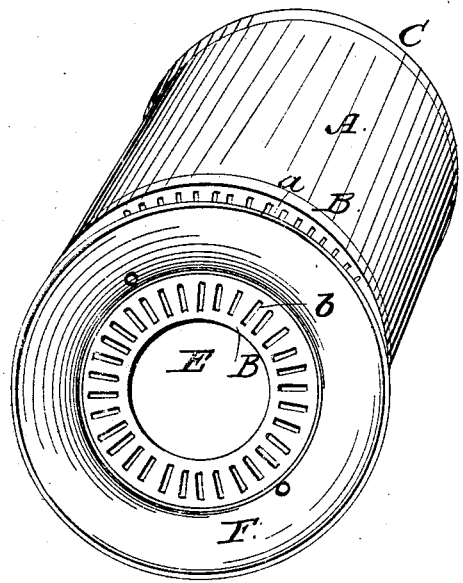
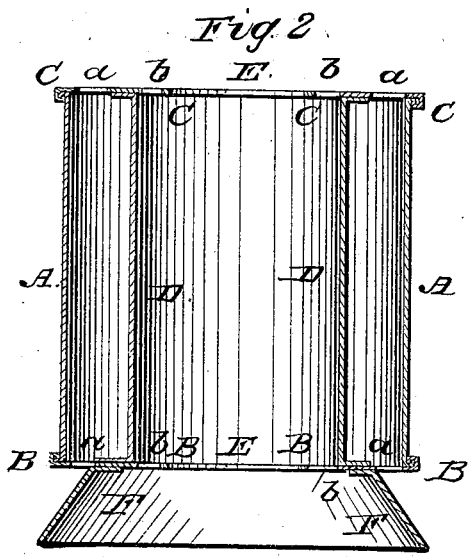
Witnesses
H. F. Eberts
Jas. S. Day
Inventor
G. W. Helt
Per Attorney
Thos. S. Sprague

United States Patent Office.

GEORGE W. HELT, OF ALMA, MICHIGAN.

Letters Patent No. 89,660, dated May 4, 1869.

STOVE-PIPE THIMBLE.

The Schedule referred to in these Letters Patent and making part of the same.

*To whom it may concern:*

Be it known that I, GEORGE W. HELT, of Alma, in the county of Gratiot, and State of Michigan, have invented a new and useful Improvement in Stove-Pipe Thimbles; and I do declare that the following is a true and accurate description thereof, reference being had to the accompanying drawings, and to the letters of reference marked thereon, and being a part of this specification, in which—

Figure 1 is a perspective view of my improvement.
Figure 2 is a vertical section of the same.
Like letters indicate like parts in each figure.

The nature of this invention relates to an improvement in stove-pipe thimbles, and consists in the peculiar construction of a double-walled thimble, provided at its lower end with a funnel for deflecting the heated air into and through the inner chamber, while the cooler air ascends through the outer chamber, in the manner and for the purpose hereinafter specified.

A, in the drawings, represents the outer cylindrical wall of my device, secured to the upper and lower heads B and C.

Within this cylinder is another and smaller cylinder D, leaving an annular chamber between it and the outer cylinder.

The inner cylinder is of a sufficiently greater diameter than the stove-pipe intended to pass through, as to form with it a similar chamber, the stove-pipe passing through the central openings E in both heads, which openings are of but sufficient diameter to receive the pipe.

Both heads are perforated with a double row of apertures, $a$ and $b$, the outer row $a$ being between the walls A and D, and the inner row $b$ between the inner wall and the stove-pipe.

F is a conical flange, or funnel, its smaller end being secured to the lower head B, between the outer and inner row of apertures.

The thimble surrounding a pipe, passing through a ceiling to the room above, the heated air thrown off from the surface of the pipe rises until it meets the funnel F, when it is deflected into the inner chamber through the apertures $b$, thence through its upper apertures into the room above, while a cooler current of air, entering the outer row of apertures $a$, passes up through the outer chamber, and prevents the outer cylinder A from becoming heated by radiation from the inner cylinder D, and consequently the wood-work surrounding the thimble cannot ignite.

I do not claim that the thimble is of itself novel, or regard it as my invention.

What I claim as my invention, and desire to secure by Letters Patent, is—

The conical flange, or funnel F, in combination with a double-walled cylinder, constructed substantially as shown and described, and operating for the purpose specified.

GEORGE W. HELT.

Witnesses:
WILLIAM MOYER,
CHARLES W. HARVEY.